United States Patent
Zhao et al.

(10) Patent No.: US 9,843,080 B2
(45) Date of Patent: Dec. 12, 2017

(54) MAGNESIUM-BASED METHODS, SYSTEMS, AND DEVICES

(71) Applicant: Alliance for Sustainable Energy, LLC, Golden, CO (US)

(72) Inventors: Yufeng Zhao, Golden, CO (US); Chunmei Ban, Golden, CO (US); Daniel Ruddy, Lafayette, CO (US); Philip A. Parilla, Lakewood, CO (US); Seoung-Bum Son, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 233 days.

(21) Appl. No.: 14/685,428

(22) Filed: Apr. 13, 2015

(65) Prior Publication Data
US 2015/0295292 A1    Oct. 15, 2015

Related U.S. Application Data

(60) Provisional application No. 61/978,317, filed on Apr. 11, 2014.

(51) Int. Cl.
*H01M 12/08* (2006.01)
*H01M 4/136* (2010.01)
(Continued)

(52) U.S. Cl.
CPC ........... *H01M 12/08* (2013.01); *H01M 4/136* (2013.01); *H01M 4/38* (2013.01); *H01M 4/382* (2013.01);
(Continued)

(58) Field of Classification Search
CPC .......... H01M 10/054; H01M 10/0568; H01M 10/0569; H01M 12/08; H01M 2300/0025;
(Continued)

(56) References Cited

U.S. PATENT DOCUMENTS 3,915,743 A    10/1975    Lauck
4,054,729 A    10/1977    Isenberg
(Continued)

FOREIGN PATENT DOCUMENTS

EP    2827437    1/2015
JP    2008153122 A  *  7/2008

OTHER PUBLICATIONS

Y. Zhao, C. Ban, Q. Xu, S.-H. Wei, and A. C. Dillon. Charge-driven structural transformation and valence versatility of boron sheets in magnesium borides, Physical Review B 83, 035406 (2011).*
(Continued)

*Primary Examiner* — Carlos Barcena
(74) *Attorney, Agent, or Firm* — Michael A. McIntyre

(57) ABSTRACT

An aspect of the present invention is an electrical device, where the device includes a current collector and a porous active layer electrically connected to the current collector to form an electrode. The porous active layer includes $MgB_x$ particles, where $x \geq 1$, mixed with a conductive additive and a binder additive to form empty interstitial spaces between the $MgB_x$ particles, the conductive additive, and the binder additive. The $MgB_x$ particles include a plurality of boron sheets of boron atoms covalently bound together, with a plurality of magnesium atoms reversibly intercalated between the boron sheets and ionically bound to the boron atoms.

7 Claims, 7 Drawing Sheets

(51) Int. Cl.
*H01M 4/58* (2010.01)
*H01M 4/62* (2006.01)
*H01M 4/38* (2006.01)
*H01M 4/485* (2010.01)
*H01M 10/054* (2010.01)
*H01M 10/0568* (2010.01)
*H01M 10/0569* (2010.01)
*H01M 4/66* (2006.01)

(52) U.S. Cl.
CPC ............ *H01M 4/485* (2013.01); *H01M 4/58* (2013.01); *H01M 10/054* (2013.01); *H01M 10/0568* (2013.01); *H01M 10/0569* (2013.01); *H01M 4/623* (2013.01); *H01M 4/625* (2013.01); *H01M 4/661* (2013.01); *H01M 2300/0025* (2013.01); *H01M 2300/0028* (2013.01); *Y02E 60/128* (2013.01)

(58) Field of Classification Search
CPC ......... H01M 2300/0028; H01M 4/136; H01M 4/38; H01M 4/382; H01M 4/485; H01M 4/58; H01M 4/623; H01M 4/625; H01M 4/661
See application file for complete search history.

(56) References Cited

U.S. PATENT DOCUMENTS

| | | | |
|---|---|---|---|
| 4,670,363 A | 6/1987 | Whitney et al. | |
| 5,948,558 A | 9/1999 | Amendola | |
| 6,468,694 B1 | 10/2002 | Amendola | |
| 2007/0026315 A1* | 2/2007 | Lampe-Onnerud ... | H01M 4/364 429/224 |
| 2008/0261094 A1* | 10/2008 | Licht ...................... | H01M 4/06 429/403 |
| 2010/0323244 A1 | 12/2010 | Chiang et al. | |
| 2011/0059355 A1 | 3/2011 | Zhang et al. | |
| 2011/0307051 A1 | 12/2011 | Atanasoska et al. | |
| 2013/0034780 A1 | 2/2013 | Muldoon et al. | |
| 2014/0038037 A1* | 2/2014 | Mohtadi ............. | H01M 10/056 429/199 |
| 2014/0220450 A1 | 8/2014 | Jilek et al. | |
| 2015/0056515 A1 | 2/2015 | Kim et al. | |

OTHER PUBLICATIONS

P. Novak, R. Imhof, O. Haas. Magnesium insertion electrodes for rechargeable nonaqueous batteries—a competitive alternative to lithium?, Electrochimica Acta 45 (1999) 351-367.*

Author Unknown, "Exploring Some New Chemistry of Layered Compounds", Chemexplore, available at http://www.chemexplore.net/layered.htm, pp. 1-24, Apr. 21, 2015.

Author Unknown, "Vanadium: divanadium pentoxide", available at http://www.webelements.com/compounds/vanadium/divanadium_pentoxide.html, pp. 1-18, Apr. 21, 2015.

Giraudet et al., "Magnesium Batteries: Towards a First Use of Graphite Fluorides", Journal of Power Sciences, Nov. 8, 2007, vol. 173, No. 1, pp. 592-598.

Licht et al., "Renewable Highest Capacity VB2/air Energy Storage", Chemical Communications, Jun. 2008, pp. 3257-3259.

Xu et al., "First-Principles Study of Lithium Borocarbide as a Cathode Material for Rechargeable Li ion Batteries", The Journal of Physical Chemistry Letters, 2011, vol. 2, pp. 1129-1132.

Zhao et al., "Charge-driven Structural Transformation and Valence Versatility of Boron Sheets in Magnesium Borides", Physical Review B, 2011, vol. 83, pp. 035406-1-035406-5.

* cited by examiner

MAGNESIUM-BASED METHODS, SYSTEMS, AND DEVICES

CROSS-REFERENCE TO RELATED APPLICATIONS

This application claims priority to U.S. Provisional Application No. 61/978,317, filed Apr. 11, 2014, the contents of which are incorporated by reference in their entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Rechargeable lithium ion batteries have found considerable use in applications such as hearing aids, computing devices, phones, and cameras. For example, lithium has served as the anode material for metal-air batteries due to its high energy density. However, the energy densities and efficiencies of currently available rechargeable lithium ion battery designs remain below what is needed for these types of batteries to meet the needs of the light duty transportation sector. Thus, the advancement of electrical vehicles and large-scale energy storage devices requires further development of high-energy-density, cost-effective, long lasting, and abuse-tolerant batteries. In addition, alternatives to lithium batteries are desirable due to lithium's tendency in some conditions to react violently, and due to lithium's tendency to form dendrites, which can limit lithium battery performance and lifespan.

Magnesium-ion batteries provide an attractive alternative electrode material to lithium-ion batteries because magnesium is abundant and has a low toxicity. Magnesium-ion batteries also offer the benefit of two-electron reactions instead of the one-electron reactions provided by lithium-ion batteries. Thus, magnesium-ion batteries may provide the energy requirements needed to meet the needs of portable devices, electric vehicles, and energy storage applications. However, to date, magnesium-ion batteries have seen only limited success. This is at least partially due to the formation of electronic and ionic insulating films on the magnesium-metal anode surfaces, in magnesium-ion batteries utilizing either non-aqueous or aqueous electrolytes. These films reduce the ability of the magnesium metal to continuously obtain magnesium ions. The chemistry of magnesium metal in aprotic electrolytic solutions often results in the growth of these films, which limits the reversible deposition/dissolution reaction of $Mg/Mg^{2+}$. Thus, there remains a need for safer and more functional rechargeable electrodes and batteries that provide better performance than the incumbent technologies, while maintaining economic viability.

SUMMARY OF THE INVENTION

An aspect of the present invention is an electrical device, where the device includes a current collector and a porous active layer electrically connected to the current collector to form an electrode. The porous active layer includes $MgB_x$ particles, where $x \geq 1$, mixed with a conductive additive and a binder additive to form empty interstitial spaces between the $MgB_x$ particles, the conductive additive, and the binder additive. The $MgB_x$ particles include a plurality of boron sheets of boron atoms covalently bound together, with a plurality of magnesium atoms reversibly intercalated between the boron sheets and ionically bound to the boron atoms.

In some embodiments of the present invention, the electrical device may include a second electrode and a non-aqueous liquid electrolyte, where at least the active layer of the first electrode and the second electrode are immersed in the electrolyte. The first electrode may have a first state, where up to 75% of the magnesium atoms are reversibly intercalated between the boron sheets, and a second state, where a portion of the magnesium atoms are reversibly deintercalated from the active layer, resulting in the transfer of $Mg^{2+}$ ions into the electrolyte.

In some embodiments of the present invention, the electrical device may include a conductive additive that is acetylene black. In some embodiments of the present invention, the electrical device may include a binder additive that is polyvinylidene fluoride. In some embodiments of the present invention, the active layer may include a $MgB_2$ content ranging from about 50 wt % $MgB_2$ to about 80 wt % $MgB_2$, a conductive additive content ranging from about 10 wt % of the conductive additive to about 30 wt % of the conductive additive, and where the remainder of active layer may be the binder additive.

In some embodiments of the present invention, a current collector may be constructed from copper, gold, aluminum, and/or silver. In some embodiments of the present invention, the electrolyte may be a solution of magnesium tetrahydroborate in dimethoxyethane. In some embodiments of the present invention, the second electrode may include magnesium metal, vanadium oxide, and/or lithium metal.

A further aspect of the present invention is a method for storing energy in a battery, where the method includes immersing a first electrode and a second electrode in a liquid, non-aqueous, $Mg^{2+}$ ion-containing, electrolyte solution, where the first electrode includes boron sheets of boron atoms covalently bound together, with a plurality of magnesium atoms reversibly intercalated between the boron sheets and ionically bound to the boron atoms. The method also includes applying a voltage across the first electrode and the second electrode, where the voltage causes the reversible deintercalation of a portion of the magnesium atoms from between the boron sheets, creates a flux of $Mg^{2+}$ ions from the first electrode into the electrolyte solution, and produces the reversible transfer of at least some of the $Mg^{2+}$ ions from at least one of the flux and/or from the electrolyte solution to the second electrode, such that the energy stored in the battery ranges from about 6 mAh/g to about 10 mAh/g.

In some embodiments of the present invention, a method for storing energy in a battery may include applying a load across the first electrode and the second electrode, such that the load produces the reversible removal of magnesium atoms from the second electrode, creates a flux of $Mg^{2+}$ ions from the second electrode into the electrolyte solution, and produces the reversible intercalation between the boron sheets of the first electrode of at least some of the $Mg^{2+}$ ions from at least one of the flux from the second electrode and/or the electrolyte solution. In some embodiments of the present invention, the second electrode may include magnesium metal and the reversible transfer of at least some of the $Mg^{2+}$ ions to the second electrode may be by electrochemical plating of $Mg^{2+}$ ions onto the magnesium metal. In some embodiments of the present invention, the second electrode may include vanadium oxide and the reversible transfer of at least some of the $Mg^{2+}$ ions to the second electrode may be by intercalation of $Mg^{2+}$ ions into the vanadium oxide.

A further aspect of the present invention is a rechargeable magnesium-based air battery that includes an anode layer formed of magnesium boride having the formula $MgB_x$, where x≥1, and is deposited onto a first support structure, a porous cathode layer, where the layer includes positive active material that at least activates carbon for absorbing oxygen in air, and where oxygen gas is used as the positive active material and is deposited onto a second support structure. The rechargeable magnesium-based air battery also includes an electrolyte, where the electrolyte is a non-aqueous solution where the solution contains Grignard reagents such as RMgX. The anode layer and cathode layer are connected electrically and the electrolyte is in contact with the first and second support structures.

In some embodiments of the present invention, the first and second support structures of a rechargeable magnesium-based air battery may be positive and negative current collectors. In some embodiments of the present invention, the anode layer may be doped. In some embodiments of the present invention, the anode layer may be doped with at least one of a Group IV/Group 14 element and/or a Group V/Group 15 element. In some embodiments of the present invention, the Group IV/Group 14 element may include at least one of carbon, silicon, germanium, tin, lead, flerovium, and/or combinations thereof. In some embodiments of the present invention, the Group V/Group 15 element may include at least one of nitrogen, phosphorous, arsenic, antimony, bismuth, and/or combinations thereof.

REFERENCE NUMERALS

| | | |
|---|---|---|
| 100 | | first electrode active material (first state) |
| 110 | | first electrode active material (second state) |
| 120 | | boron atom |
| 130 | | intercalated magnesium atom |
| 140 | | deintercalated magnesium ion |
| 150 | | vacancy |
| 200 | | second electrode active material (first state) |
| 210 | | second electrode active material (second state) |
| 220 | | vanadium atom |
| 230 | | oxygen atom |
| 240 | | intercalated magnesium atom |
| 250 | | vacancy |
| 300 | | electrical device |
| 305 | | first electrode |
| 310 | | electrode active material |
| 320 | | binder additive |
| 330 | | conductive additive |
| 340 | | interstitial space |
| 350 | | electrolyte |
| 360 | | current collector |
| 400 | | coin battery |
| 410 | | first case |
| 420 | | second case |
| 430 | | spring |
| 440 | | first electrode |
| 450 | | separator |
| 460 | | second electrode |
| 600 | | magnesium-boride-based air battery |
| 602 | | anode current collector |
| 604 | | anode |
| 610 | | cathode |
| 620 | | breathable layer |
| 630 | | diffusion layer |
| 640 | | carbon conductive material |
| 650 | | catalyst layer |
| 660 | | cathode current collector |
| 670 | | electrolyte |
| 700 | | method of manufacture |
| 702 | | fabricating a first support structure |
| 704 | | depositing a magnesium boride based anode |
| 706 | | forming a non-aqueous electrolyte |
| 708 | | fabricating a porous cathode layer |
| 710 | | depositing the electrolyte layer |

DETAILED DESCRIPTION OF EXEMPLARY EMBODIMENTS

Figure 1:
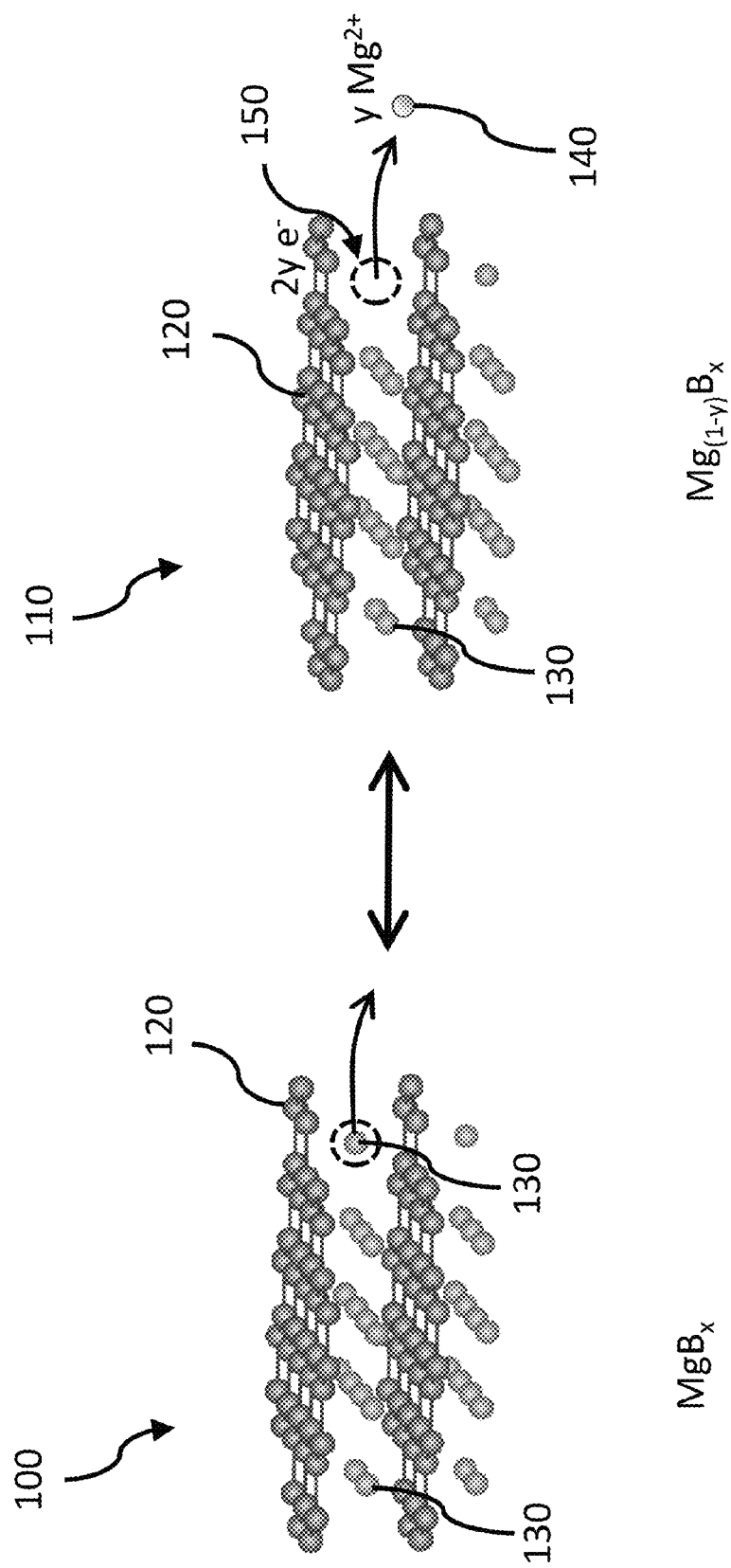
FIG. 1 illustrates an active material for an electrode, including reversibly intercalated/deintercalated magnesium atoms/ions between boron sheets, according to exemplary embodiments of the present invention.

FIG. 1 illustrates two reversible states 100 and 110 for an electrode active material constructed of $MgB_x$. A plurality of covalently bound boron atoms 120 forms layers of parallel crystalline sheets with spaces in between the sheets. A plurality of magnesium atoms 130 is positioned within the spaces and between the sheets of boron atoms. Magnesium atoms in this position are referred to as intercalated within the crystalline structure of the $MgB_x$. X may be greater than or equal to one. In the case of magnesium diboride, $MgB_2$, x is equal to two.

Applying a voltage, or alternatively, a load to a battery system that includes $MgB_x$ as the active material for one of its two electrodes, may cause a portion of the intercalated magnesium atoms 130 to be removed from the $MgB_x$ crystalline structure as $Mg^{2+}$ ions 140, or deintercalate from the crystalline structure. The formation of the $Mg^{2+}$ ions 140 results in the release of 2 electrons ($e^-$), which are transferred to the second electrode through the external circuit. The $Mg^{2+}$ ions 140 may then enter the battery's electrolyte (not shown) to travel towards the second electrode (not shown) of the battery, to charge the battery.

This process is reversible because applying the opposite of what was just described, either a load or a voltage, can switch the battery from the second state 110 back to the first state 100. For example, if deintercalation of $Mg^{2+}$ ions 140 was achieved by applying a voltage to the battery, the original state 100 may be renewed by applying a load to the battery. Alternatively, if deintercalation of $Mg^{2+}$ ions 140 was achieved by applying a load to the battery, the original state 100 may be renewed by applying a voltage to the battery.

The reversible intercalation/deintercalation process summarized in FIG. 1 for a first electrode made from a $MgB_x$ containing active material may be represented by the following reaction, where the left side of the reaction corresponds to the first state, and the right side of the reaction corresponds to the second state:

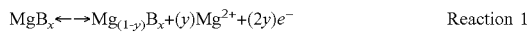

$$MgB_x \leftarrow\rightarrow Mg_{(1-y)}B_x + (y)Mg^{2+} + (2y)e^-$$  Reaction 1

Figure 2:
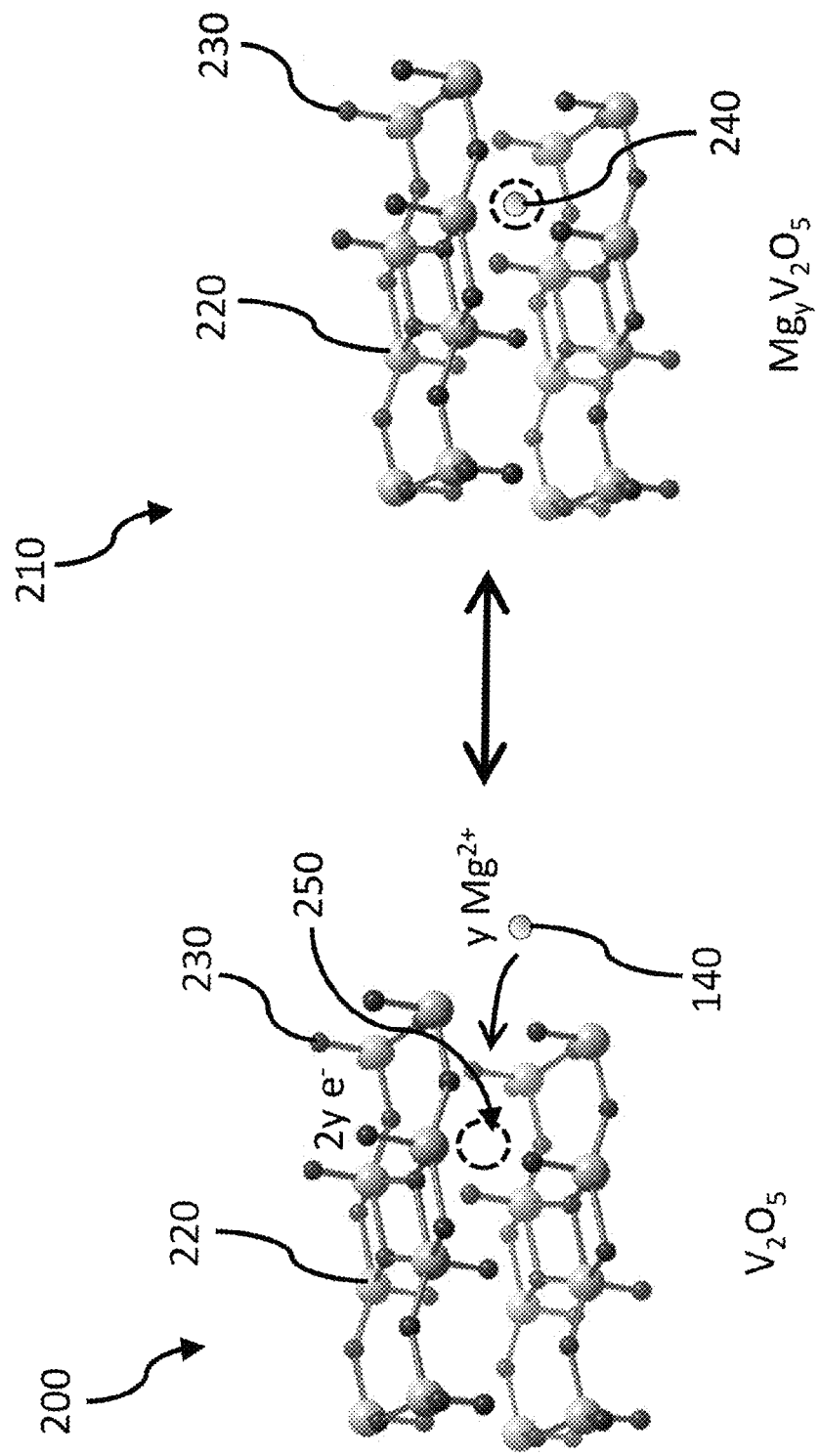
FIG. 2 illustrates an active material for an electrode, including reversibly intercalated/deintercalated magnesium atoms/ions between sheets of vanadium oxide, according to exemplary embodiments of the present invention.

FIG. 2 illustrates two exemplary reversible states 200 and 210 for a second electrode of a rechargeable battery that includes a first $MgB_x$ electrode. In this example, reversible intercalation of $Mg^{2+}$ ions 140 may also be achieved at a second electrode constructed of vanadium oxide (e.g. $V_2O_5$). In the first state 200, the active material includes a plurality of covalently bound vanadium atoms 220 and oxygen atoms 230, which form layers of parallel crystalline $V_2O_5$ sheets with spaces in between the sheets. These spaces provide vacancies 250 for magnesium ions 140 to move into or intercalate.

Applying a voltage, or alternatively, a load to a battery system that includes $V_2O_5$ as the active material for the second electrode, may cause a portion of the $Mg^{2+}$ ions 140 to move from the electrolyte solution (not shown) and intercalate between the sheets of $V_2O_5$ to occupy the vacancies 250. The electrons removed from the magnesium atoms at the first electrode may then counter-balance the intercalated $Mg^{2+}$ ions to form intercalated magnesium atoms 240.

As with the $MgB_x$ active material of the first electrode, a second electrode including $V_2O_5$ active material may also be reversible between the two states 200 and 210. Again, as with the first electrode, applying the opposite of what was just described, either a load or a voltage, may switch the battery from the second state 210 back to the first state 200. For example, if intercalation of $Mg^{2+}$ ions was achieved by applying a voltage to the battery, the original state 200 may be renewed by applying a load to the battery. Alternatively, if intercalation of $Mg^{2+}$ ions was achieved by applying a load to the battery, the original state 200 may be renewed by applying a voltage to the battery.

The reversible intercalation/deintercalation process summarized in FIG. 2 for a second electrode made from a $V_2O_5$ containing active material may be represented by the following reaction:

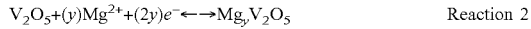

$$V_2O_5 + (y)Mg^{2+} + (2y)e^- \leftarrow\rightarrow Mg_y V_2O_5$$  Reaction 2

In some examples of a $MgB_x$ containing battery, the second electrode may be constructed using a metal active material such as magnesium metal or lithium metal. In these cases, $Mg^{2+}$ ions may not reversibly intercalate into the second electrode's active material. Instead, the reaction occurring in these examples may include the reversible electrochemical plating of magnesium metal onto the second electrode's active material.

Figure 3:
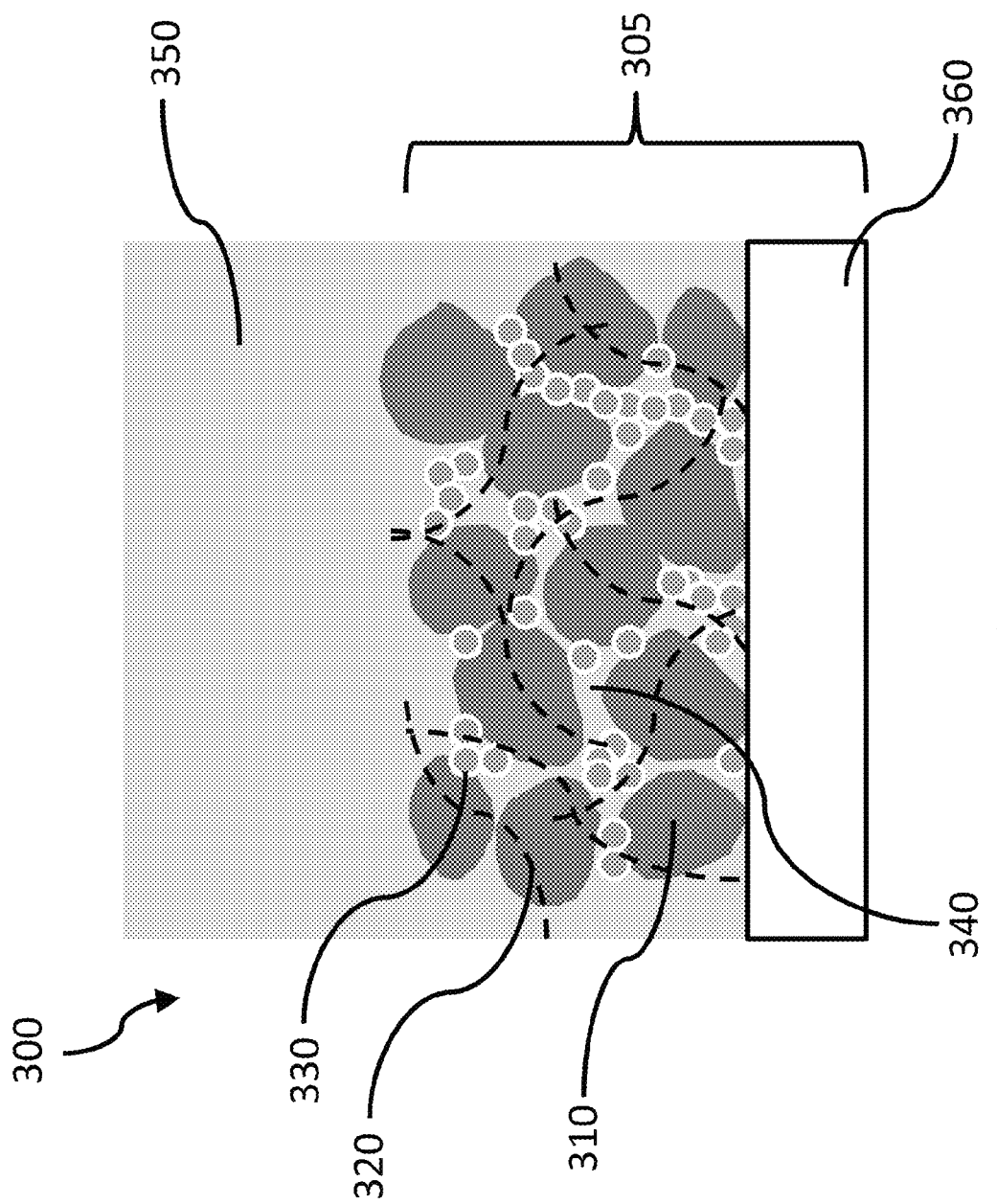
FIG. 3 illustrates an electrical device, according to exemplary embodiments of the present invention.

FIG. 3 illustrates an exemplary electrical device 300 that utilizes the elements and features described above. In this example, a first electrode 305 may be constructed from a mixture of $MgB_2$ active material 310, a conductive additive 330, and a binder additive 320 to form a solid mixture with interstitial spaces between the $MgB_2$ active material 310, the conductive additive 330, and the binder additive 320. The mixture of the $MgB_2$ active material 310, the conductive additive 330, and the binder additive 320 may be applied to a surface of a current collector 360 to form the first electrode 305. The first electrode 305 may then be immersed in an electrolyte 350. In some examples, the electrolyte 350 may be a non-aqueous liquid, which may flow into and fill the interstitial spaces 340.

An electrode similar to the example illustrated in FIG. 3 may be prepared from slurries ranging from about 50 wt % active material to about 99 wt % active material. For example a mixture of $MgB_2$ powder may be combined with a binder additive (e.g. polyvinylidene fluoride) and a conductive additive (e.g. carbon black) in a solvent (e.g. n-methyl pyrrolidone) to make a mixture. To insure a uniform distribution of the components is attained, the mixture may be agitated using an appropriate mixing device. Once a uniform distribution is attained, the mixture may be applied to the current collector (e.g. an Al and/or Cu foil) at a thickness ranging from about 10 μm to about 50 μm. After the mixture has been applied to the current collector, it may be dried and/or cured by heating the mixture and the current collector to a temperature ranging from about 50° C. to about 100° C., and maintaining the temperature for a period of time ranging from about 1 hour to about 10 hours, thus producing the electrode. A final circular shape may be attained by punching the foil containing the electrode mixture, using an appropriate punching mechanism. In some examples, the $MgB_2$ containing electrode may be punched into disks with diameters ranging from about 5/16 of an inch to about ½ an inch.

Figure 4:
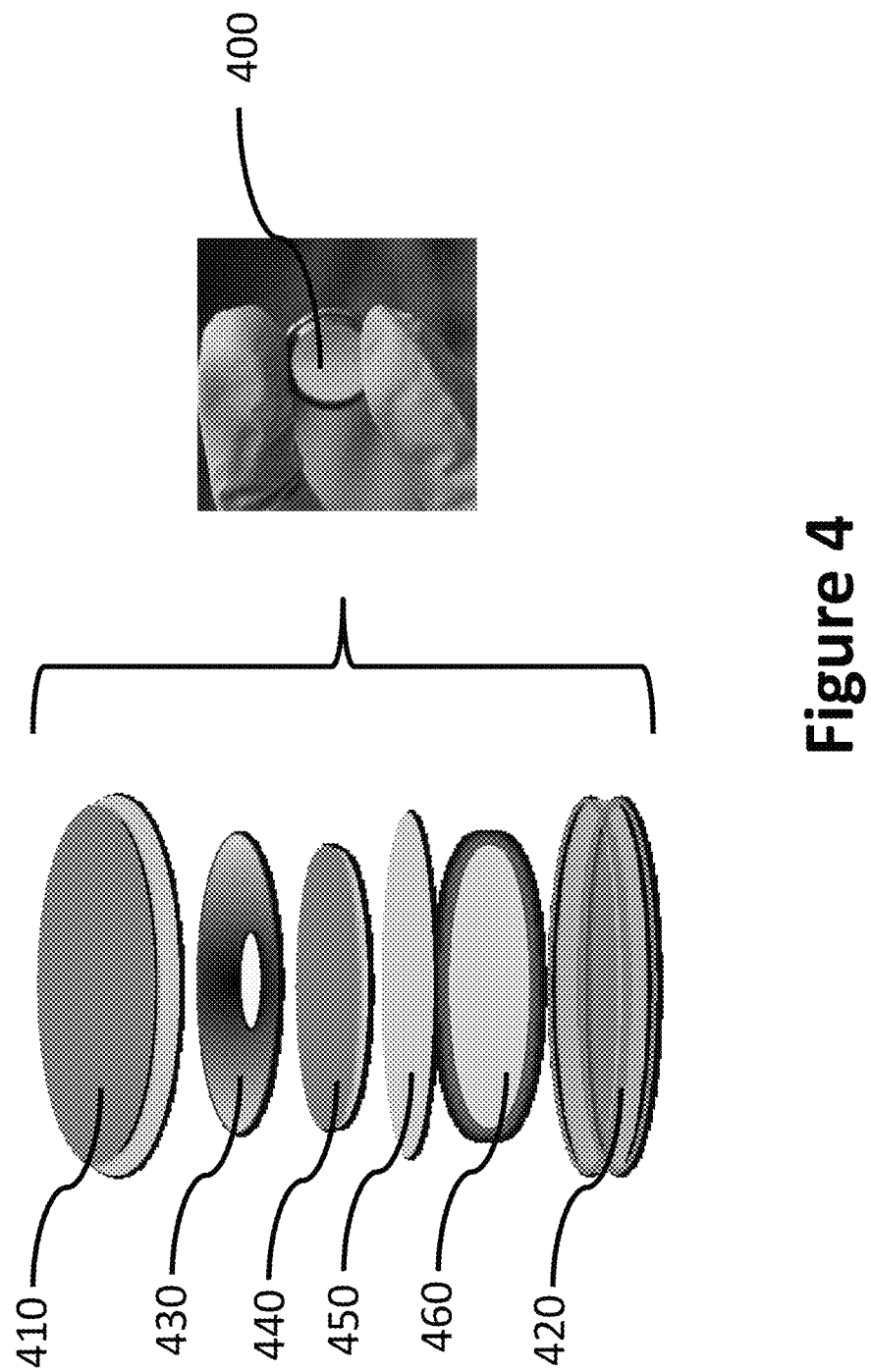
FIG. 4 illustrates a coin battery, according to exemplary embodiments of the present invention.

An electrode formed by such a method than may be utilized to fabricate a coin cell battery as illustrated in FIG. 4. For example, a coin cell battery 400 may be constructed by separating a first electrode 440 from a second electrode 460, utilizing a separator 450. The resultant "sandwich" of the first electrode 440, the second electrode 460, and the separator 450 may then be placed on a second case 420, followed by the addition of electrolyte (not shown). The "sandwich" may then be secured between a first case 410 and the second case 420, with sufficient force supplied by a spring 430, to insure proper contact between all of the battery elements. In this exemplary case, the volume of electrolyte used may vary from about 0.1 ml of electrolyte to about 1 ml of electrolyte.

Figure 5A:
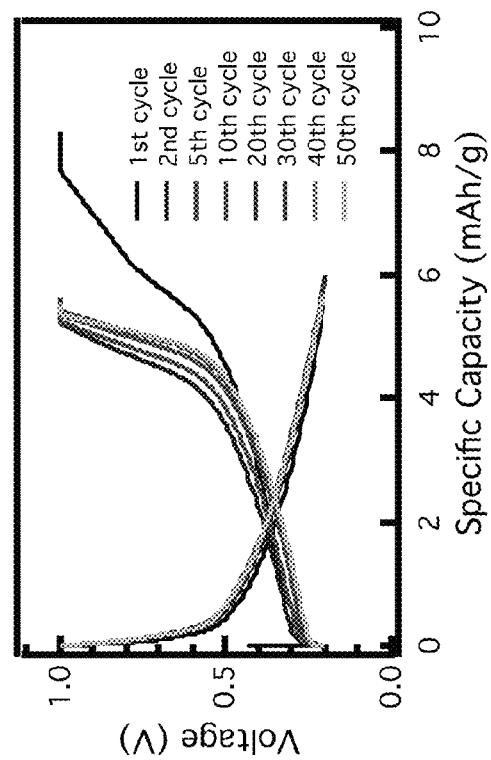
FIGS. 5a and 5b illustrate experimental results of the reversible capacity for a battery including a $MgB_2$ first electrode, a magnesium metal second electrode, and a Mg-ion electrolyte, according to exemplary embodiments of the present invention.
Figure 5B:
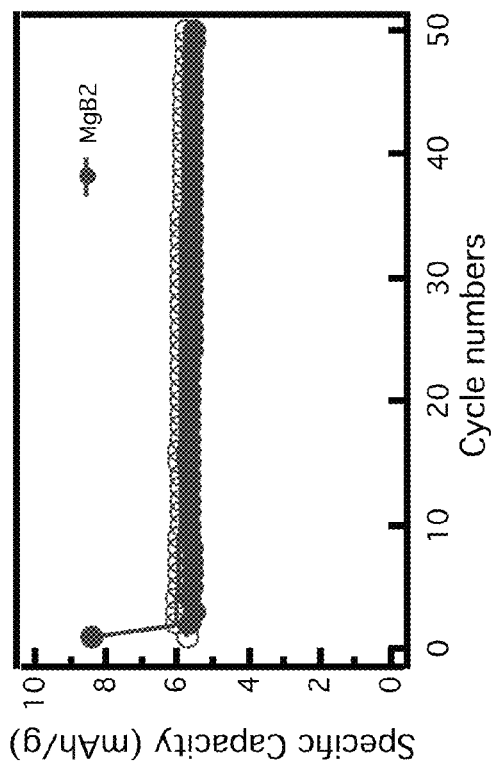

FIGS. 5a and 5b summarize experimental data obtained from an exemplary $MgB_2$ containing battery. In this example, the battery includes a cathode containing $MgB_2$ as the active material. The $MgB_2$ is mixed with acetylene black (e.g. conductive additive) and polyvinylidene fluoride (e.g. binder additive) at about 60 wt %, about 20 wt %, and about 20 wt %, respectively. This mixture is applied to a copper current collector and treated as described above to form the cathode. In this example, magnesium metal is used as the anode. Both electrodes are placed in an electrolyte solution of magnesium tetrahydroborate dissolved in dimethoxyethane. FIGS. 5a and 5b summarize the cyclical behavior of this exemplary battery for a total of 50 charge-discharge cycles.

Magnesium-boride-based layered materials may replace magnesium metal in Mg-ion/air batteries. Magnesium boride as the anode material may also enable the use of non-aqueous electrolytes to achieve greater energy densities than current Li-ion technology. This disclosure describes, among other things, a magnesium boride electrode material for magnesium-based battery devices that are rechargeable, such as magnesium-boride-air batteries.

Magnesium-boride-air batteries usually comprise three parts: a magnesium-containing anode, an air cathode and an electrolyte. The reactions involved in an exemplary embodiment are as follows:

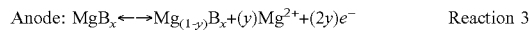

Anode: $MgB_x \leftarrow\rightarrow Mg_{(1-y)}B_x + (y)Mg^{2+} + (2y)e^-$  Reaction 3

Cathode: $O_2 + 4e^- \rightarrow 2O^{2-}$ or  Reaction 4

$$O_2 + 2e^- \rightarrow 2O^- \text{ or} \qquad \text{Reaction 5}$$

$$O_2 + e^- \rightarrow (O_2)^- \qquad \text{Reaction 6}$$

Figure 6:
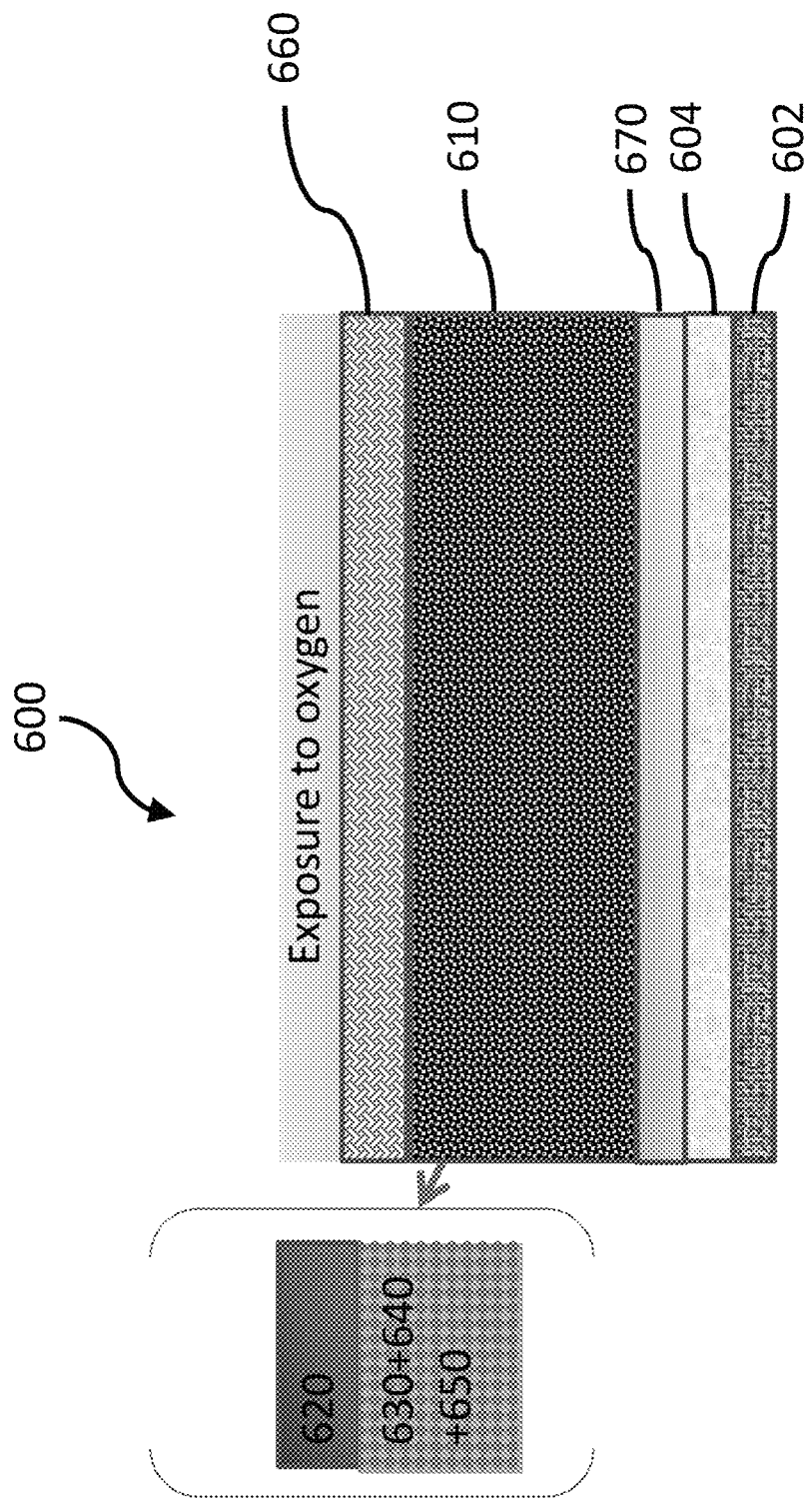
FIG. 6 illustrates a rechargeable, magnesium-boride-based air battery, according to exemplary embodiments of the present invention.

FIG. 6 illustrates an example of a magnesium-boride-based air battery 600. The battery 600 may include two current collectors, an anode current collector 602 and a cathode current collector 660. The anode current collector 602 may serve as a point of contact for an anode 604. The anode current collector 602 may include carbon, nickel, copper, and/or any other metal or non-metal material suitable for use as a durable, electrically conductive support structure. Further, the anode current collector 602 may be in contact with the anode 604. The anode 604 is a source for Mg-ions. In this example, the anode 604 is constructed from magnesium boride. However, the anode 604 may be constructed from any magnesium boride containing material suitable for supplying magnesium ions. The anode 604 may be doped with carbon and/or carbon-derived materials such as graphite, graphene or any combination or variation thereof. Suitable dopants may include at least one Group IV/Group 14 elements, such as carbon, silicon, germanium, tin, lead, flerovium, Group V/Group 15 elements such as nitrogen, phosphorous, arsenic, antimony, bismuth, or any combination thereof. The anode current collector 602 and the anode 604 may be a single layer, or the same layer. Although not shown, one or more circuits may connect the anode 604 and the cathode 610 electrically.

Cathode 610 may include a metal foam/mesh as the current collector 660, constructed from various types of conductive materials, for example, carbon nanofiber, carbon nanotubes, and/or nanostructured catalysts. The pore size, pore distribution, surface area, and electrochemical activity of the cathode layer 610 may be varied by selection of appropriate types and mixing ratios of the materials desired. An exemplary cathode may be include several layers: a waterproof breathable layer 620, a gas diffusion layer 630, and/or a catalyst layer 650 bound to a current collector 660 of a mesh/porous layer. As shown in FIG. 6, an exemplary cathode 610 may include several layers: a waterproof breathable layer 620 and a gas diffusion layer 630, which may also include carbon conductive materials 640, and a catalyst layer 650. The waterproof breathable layer 620 may be constructed of a water-repellant porous substance. The gas diffusion layer 630 may have a high porosity and a high electronic conductivity, and may be constructed from acetylene black containing hydrophobic materials such as PTFE. The catalyst layer 650 may be primarily composed of active catalysts for the oxygen reduction reaction. In some case, noble metals such as Pt and Ag may be used in the catalyst layer 650 of the cathode 610. In other examples, N-doped carbonaceous, metal oxides, and/or metal oxide-carbonaceous mixtures may be used as catalysts in the catalyst layer 650 of the cathode 610. The battery 600 may also include a cathode current collector 660. The cathode current collector may serve as a point of contact for the cathode 610. The cathode current collector may be constructed of carbon, nickel, aluminum, and/or any other metal or non-metal material suitable for use as a lightweight, electrically conductive support structure. Further, the cathode current collector 660 and the cathode 610 may be a single layer of material.

The electrolyte 670 may be a non-aqueous electrolyte with a low vapor pressure. The electrolyte 670 may also have sufficient Mg-ion conductivity and oxygen solubility and preferably undergoes minimal or no side reactions with the anode and cathode materials. As described herein, the electrolyte may include a non-aqueous solution containing Grignard reagents such as RMgX, where R is an alkyl or aryl. For example, R may be a methyl group, an ethyl group, and/or a propyl group. In addition, R may be a phenyl group, a methyl substituted phenyl (tolyl) group and/or a dimethyl substituted phenyl group.

Figure 7:
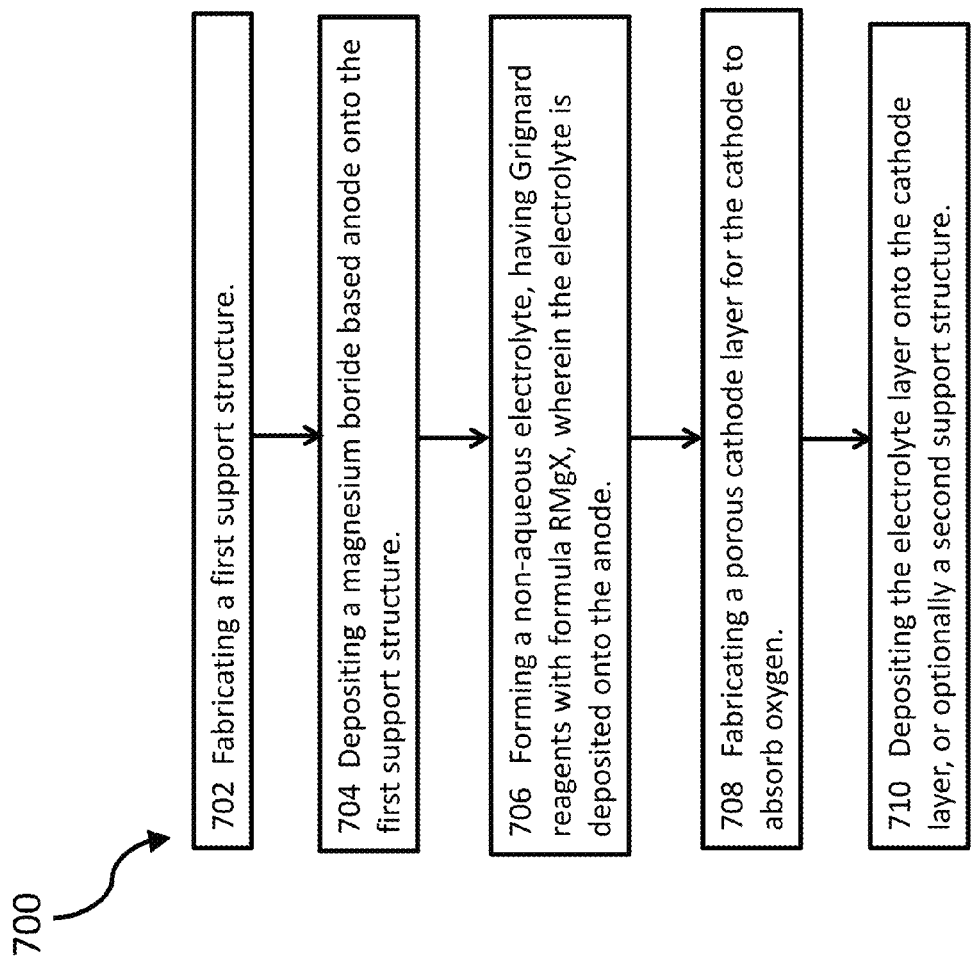
FIG. 7 illustrates a method 200 to manufacture a rechargeable magnesium-boride-based air battery, according to exemplary embodiments of the present invention.

FIG. 7 illustrates an exemplary method 700 to manufacture a rechargeable magnesium-boride based air battery. The method 700 includes fabricating 702 a first support structure, depositing 704 a magnesium boride based anode onto the support structure, forming 706 a non-aqueous electrolyte, having Grignard reagents according to the formula RMgX, where the non-aqueous electrolyte may be deposited onto the anode. The method 700 continues with fabricating 708 a porous cathode layer for the cathode to absorb oxygen, and depositing 710 the electrolyte layer onto the cathode layer and/or a cathode current collector layer. The method 700 may include an anode current collector. The anode current collector may serve as a point of contact for the anode. The anode current collector may be constructed using carbon, nickel, copper, and/or any other metal or non-metal material suitable for use as a durable, electrically conductive support structure. Further, the anode current collector may be in contact with the anode. The anode may be a source for metal-ions. The anode may be magnesium boride and/or any magnesium-based material suitable for supplying magnesium ions. The anode may be doped with carbon, carbon-derived materials such as graphite, graphene and/or any combination thereof. Suitable dopants may include Group IV/Group 14 elements, such as carbon, silicon, germanium, tin, lead, flerovium, Group V/Group 15 elements such as nitrogen, phosphorous, arsenic, antimony, bismuth, or any combination thereof. The anode current collector and the anode may be constructed as a single layer of material.

The cathode in method 700 may include various types of conductive material such as carbon nanofiber, carbon nanotubes, and/or nanostructured catalysts. The pore size, pore distribution, surface area, and electrochemical activity of the cathode layer may be varied by the selection of the appropriate types and/or mixing ratios of the materials desired. The cathode may have several layers: a waterproof breathable layer, a gas diffusion layer and/or a catalyst layer bound to a current collector made of a mesh/porous layer. The waterproof layer may be constructed from a water-repellant porous substance. The gas diffusion layer may have a high porosity and/or electronic conductivity, and may be constructed, for example, from acetylene black and/or hydrophobic materials such as PTFE. The catalyst layer may primarily contain active catalyst for the oxygen reduction reaction. Active catalyst in the air cathode may be noble metals such as Pt and Ag. Other active catalyst materials for an air cathode may include N-doped carbonaceous, metal oxides and/or metal oxide-carbonaceous mixtures. The method 700 may include a cathode current collector. The cathode current collector may serve as a point of contact for the cathode. The cathode current collector may include carbon, nickel, aluminum, and/or any other metal and/or any non-metal material suitable for use as a lightweight, electrically conductive support structure.

The electrolyte in method 700 may be a non-aqueous electrolyte with a low vapor pressure. The electrolyte may also provide sufficient ion conductivity and oxygen solubility and preferably undergoes minimal or no side reactions with the magnesium oxide radical. The electrolyte may include a non-aqueous solution containing Grignard reagents such as RMgX, wherein R may be an alkyl group or an aryl group. R may be a methyl group, an ethyl group, and/or a propyl group. R may be a phenyl group, a methyl substituted phenyl (tolyl) group, and/or a dimethyl substituted phenyl group.

It is noted that there are alternative ways of implementing the embodiments disclosed herein. While a number of exemplary aspects and embodiments have been discussed above, those of skill in the art will recognize certain modifications, permutations, additions and sub combinations thereof. Accordingly, the present embodiments are to be considered as illustrative and not restrictive. Furthermore, the claims are not to be limited to the details given herein, and are entitled their full scope and equivalents thereof.

The invention claimed is:

1. An electrical device comprising:
a current collector;
a liquid electrolyte comprising magnesium tetrahydroborate; and
an active layer electrically connected to the current collector to form an anode, wherein:
the active layer comprises a plurality of particles, a conductive additive, and a binder additive,
the plurality of particles are present at a first amount between 50 wt % and 70 wt %, the conductive additive is at a second amount between 10 wt % and 30 wt %, and the binder additive is at a third amount of less than or equal to 40 wt %,
the plurality of particles, the conductive additive, and the binder additive form a plurality of interstitial spaces within the active layer,
a portion of the liquid electrolyte is positioned within and fills at least a portion of the plurality of interstitial spaces,
the plurality of particles have a first state comprising at least two boron sheets with a plurality of magnesium atoms intercalated between the boron sheets resulting in a first composition $MgB_2$,
the plurality of particles have a second state comprising the at least two boron sheets and a fraction, 1−y, of the plurality of magnesium atoms intercalated between the boron sheets resulting in a second composition $Mg_{(1-y)}B_2$, where $0<y\leq 1$,
while in the second state, the liquid electrolyte contains at least y $Mg^{2+}$ cations, and
the electrical device is capable of reversibly switching between the first state and the second state.

2. The electrical device of claim 1 further comprising:
a cathode, wherein:
the anode and the cathode are immersed in the liquid electrolyte.

3. The electrical device of claim 2, wherein the cathode comprises vanadium oxide.

4. The electrical device of claim 1, wherein the conductive additive comprises acetylene black.

5. The electrical device of claim 1, wherein the binder additive comprises polyvinylidene fluoride.

6. The electrical device of claim 1, wherein the current collector comprises at least one of aluminum, copper, gold, or silver.

7. The electrical device of claim 1, wherein the liquid electrolyte further comprises dimethoxyethane.

* * * * *